(12) United States Patent
Moore

(10) Patent No.: US 10,335,939 B2
(45) Date of Patent: Jul. 2, 2019

(54) LUBRICATION SYSTEM FOR HYDRAULIC HAMMER

(71) Applicant: Caterpillar Inc., Peoria, IL (US)

(72) Inventor: Cody T. Moore, Waco, TX (US)

(73) Assignee: Caterpillar Inc., Deerfield, IL (US)

( * ) Notice: Subject to any disclaimer, the term of this patent is extended or adjusted under 35 U.S.C. 154(b) by 208 days.

(21) Appl. No.: 15/291,900

(22) Filed: Oct. 12, 2016

(65) Prior Publication Data

US 2017/0028541 A1     Feb. 2, 2017

(51) Int. Cl.
| | |
|---|---|
| *E02F 3/96* | (2006.01) |
| *F16N 7/38* | (2006.01) |
| *B25D 17/00* | (2006.01) |
| *B25D 17/26* | (2006.01) |
| *F16N 13/02* | (2006.01) |
| *F16N 13/16* | (2006.01) |
| *F16N 19/00* | (2006.01) |

(52) U.S. Cl.
CPC .............. *B25D 17/26* (2013.01); *B25D 17/00* (2013.01); *E02F 3/966* (2013.01); *F16N 7/38* (2013.01); *F16N 13/02* (2013.01); *F16N 13/16* (2013.01); *F16N 19/00* (2013.01); *B25D 2250/121* (2013.01)

(58) Field of Classification Search
CPC ......... B25D 17/26; F16N 29/04; F16N 11/10; F16N 13/16; F16N 7/38
USPC ................................ 184/6.14, 27.4, 27.1, 29
See application file for complete search history.

(56) References Cited

U.S. PATENT DOCUMENTS

| | | | | |
|---|---|---|---|---|
| 1,982,093 | A * | 11/1934 | Zerk | F16N 7/385 |
| | | | | 184/29 |
| 2,505,839 | A * | 5/1950 | Scovell | F16N 3/12 |
| | | | | 222/262 |
| 3,040,835 | A * | 6/1962 | Ahnert | F16N 7/34 |
| | | | | 138/31 |
| 3,291,350 | A * | 12/1966 | Malec | F16N 3/12 |
| | | | | 222/318 |
| 3,595,342 | A * | 7/1971 | O'Leary | F16N 7/34 |
| | | | | 184/39.1 |
| 4,911,267 | A * | 3/1990 | Matsuda | B22D 17/2007 |
| | | | | 184/106 |
| 5,060,761 | A * | 10/1991 | Arndt | B25D 17/26 |
| | | | | 184/29 |

(Continued)

FOREIGN PATENT DOCUMENTS

GB            831676      3/1960

*Primary Examiner* — Henry Y Liu
(74) *Attorney, Agent, or Firm* — Hibshman Claim Construction PLLC

(57) ABSTRACT

A lubrication system for a hydraulic hammer is disclosed. The lubrication system includes a housing having a first chamber, and a control valve, disposed proximal to a first end of the first chamber, moveable from a closed position to an open position. A piston is received within the first chamber and moveable between a first position and a second position. The piston includes a first end having a cavity, and a second end facing towards a second chamber, which receives hydraulic fluid therein. In the second position, when the first chamber is filled with air in the first position of the piston, the cavity defined at the first end of the piston maintains pressure of the air less than a biasing force of a resilient member that keeps the control valve in the closed position.

6 Claims, 5 Drawing Sheets

(56) References Cited

U.S. PATENT DOCUMENTS

| | | | | |
|---|---|---|---|---|
| 5,249,645 A * | 10/1993 | Wiklund | F16N 7/34 | 184/108 |
| 5,570,868 A * | 11/1996 | Flaming | F04B 53/18 | 184/29 |
| 5,779,105 A * | 7/1998 | Brown | F16N 3/12 | 222/262 |
| 5,924,602 A * | 7/1999 | Brown | F16N 3/12 | 222/262 |
| 6,145,625 A * | 11/2000 | Prokop | F16N 11/10 | 184/105.2 |
| 6,296,078 B1 * | 10/2001 | Liu | F16N 13/02 | 184/29 |
| 6,405,810 B1 * | 6/2002 | Grach | E21B 17/006 | 175/52 |
| 6,488,121 B2 * | 12/2002 | Itoh | F16H 57/0458 | 184/55.2 |
| 6,631,787 B2 * | 10/2003 | Conley | B25D 17/26 | 173/DIG. 3 |
| 6,695,590 B1 * | 2/2004 | Rydin | F04B 13/00 | 184/105.2 |
| 6,923,348 B2 * | 8/2005 | Grach | F16N 11/10 | 222/262 |
| 7,665,976 B2 * | 2/2010 | Usui | F02M 59/102 | 417/470 |
| 7,726,448 B2 * | 6/2010 | Paluncic | F16N 11/08 | 184/41 |
| 7,900,748 B2 * | 3/2011 | Bukhari | F16N 7/36 | 184/29 |
| 8,689,940 B2 * | 4/2014 | Jagdale | B25D 17/26 | 137/386 |
| 9,010,493 B2 * | 4/2015 | Jagdale | F16N 7/38 | 184/6.14 |
| 9,217,341 B2 * | 12/2015 | Hiner | F15B 13/0403 | |
| 9,303,814 B2 * | 4/2016 | Ifield | F16N 7/385 | |
| 9,358,675 B2 * | 6/2016 | Sattelberger | B25D 17/26 | |
| 9,643,310 B2 * | 5/2017 | Moore | B25D 9/08 | |
| 2001/0030084 A1 * | 10/2001 | Conley | B25D 17/26 | 184/26 |
| 2004/0129735 A1 * | 7/2004 | Grach | F16N 11/10 | 222/389 |
| 2006/0243528 A1 * | 11/2006 | Bukhari | F16N 7/36 | 184/27.1 |
| 2007/0187181 A1 * | 8/2007 | Brendel | F16N 13/06 | 184/6.14 |
| 2008/0296035 A1 * | 12/2008 | Lohmann | B25D 9/265 | 173/177 |
| 2009/0308692 A1 * | 12/2009 | Sattelberger | B25D 17/26 | 184/29 |
| 2011/0183799 A1 * | 7/2011 | Young | F16G 13/04 | 474/148 |
| 2012/0043163 A1 * | 2/2012 | Jagdale | B25D 17/26 | 184/6.4 |
| 2013/0240299 A1 * | 9/2013 | Jagdale | F16N 7/38 | 184/6.14 |
| 2013/0277150 A1 * | 10/2013 | Belik | F16N 13/00 | 184/26 |
| 2015/0047928 A1 * | 2/2015 | Hiner | F15B 13/0403 | 184/6.14 |
| 2016/0046009 A1 * | 2/2016 | Moore | B25D 9/08 | 184/6.14 |

* cited by examiner

LUBRICATION SYSTEM FOR HYDRAULIC HAMMER

TECHNICAL FIELD

The present disclosure relates to a hydraulic hammer, and more particularly to a lubrication system of the hydraulic hammer.

BACKGROUND

Hydraulic hammers are used at work sites to break up large and hard objects such as rocks and concrete before such objects can be moved away. Generally, hydraulic hammers are coupled to a machine, such as excavators or other machines. The hydraulic hammers are powered by a combination of hydraulic power and pneumatic power. The hydraulic hammers are provided with a reservoir/cartridge for supplying lubricants such as grease, to bearing surfaces in the hydraulic hammer so as to reduce friction between the moving parts. The hydraulic hammier and the cartridge are provided with a glass window so as to allow an operator to monitor the level of grease within the cartridge. However, at times, the operator may fail to do so and fail to observe that the cartridge is empty. In such situations air is pumped into the moving parts of the hydraulic hammer and may cause the hydraulic hammer to operate inefficiently.

U.S. Pat. No. 6,145,625 hereinafter referred as the '625 patent, describes a grease lubricator for construction machine is provided. The lubricator for delivering grease lubricant to lubricating locations of a machine is coupled to a grease container and has a work chamber in which a delivery piston reciprocates. To ensure that a compressible medium, such as air which has been drawn into the work chamber is rapidly expelled therefrom, the work chamber is divided by a grease return device into a compressing portion and a delivery portion. Triggered by a sufficiently high pressure level which prevails in the compressing portion and which is present only during grease delivery, an otherwise blocked return connection is established between the compressing portion and a supply port which couples the grease container to the work chamber, as long as the head of the delivery piston, in the course of its grease delivery stroke (forward stroke) is situated in the compressing portion. However, the '625 patent may not expel the air which enters through the lubricator.

SUMMARY OF THE DISCLOSURE

In one aspect of the present disclosure, a lubrication system for a hydraulic hammer is provided. The lubrication system includes a housing having a first chamber having a first end and a second end distal to the first end. The lubrication system further includes a reservoir containing a lubricant coupled proximal to the first end of the first chamber to supply the lubricant to the first chamber. The lubrication system further includes a control valve disposed proximal to the first end of the first chamber and fluidly communicated with the first chamber. The control valve is moveable from a closed position to an open position against a biasing force of a resilient member to allow flow of the lubricant to a plurality of components disposed downstream of the control valve. The lubrication system further includes a piston received within the first chamber, and moveable between a first position and a second position. The piston includes a first end facing towards the control valve, and including a cavity. The piston further includes a second end opposite to the first end and facing towards a second chamber defined at the second end of the first chamber. The second chamber is adapted to receive a hydraulic fluid therein to move the piston from the first position to the second position. In the second position, when the lubricant is received within the first chamber in the first position of the piston, a pressure of the lubricant causes movement of the control valve from the closed position to the open position to allow flow of the lubricant to the plurality of components. Further, in the second position, when the first chamber is filled with air in the first position of the piston, the cavity defined at the first end of the piston maintains pressure of the air less than the biasing force of the resilient member to keep the control valve in the closed position.

In another aspect of the present disclosure, a pump for supplying lubricant in a hydraulic hammer is provided. The pump includes a housing having a first chamber adapted to receive a lubricant therein and a second chamber adapted to receive a hydraulic fluid therein. The pump further includes a piston received within the first chamber, and moveable between a first position and a second position. The piston includes a first end facing towards a control valve disposed adjacent to a first end of the first chamber, and including a cavity defining a volume. The volume is defined based on parameters including a biasing force of a resilient member causing movement of the control valve from an open position to a closed position and a volume of the first chamber defined by the first end of the piston in the first position of the piston. The piston further includes a second end opposite to the first end and facing towards the second chamber to move the piston from the first position to the second position based on a pressure of the hydraulic fluid. In the second position, when the first chamber is filled with air in the first position of the piston, the cavity defined at the first end of the piston maintains pressure of the air less than the biasing force of the resilient member to keep the control valve in the closed position.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claim.

Figure 1:
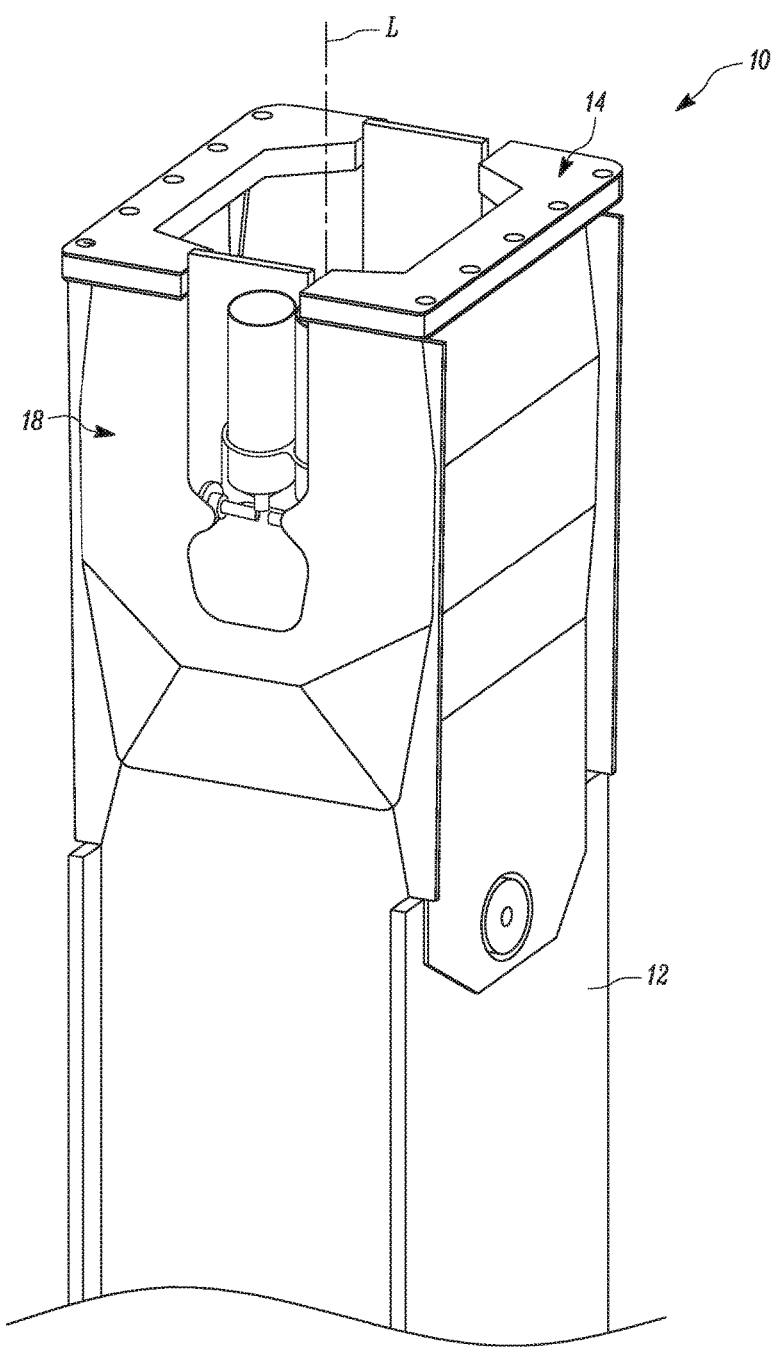
FIG. 1 is a perspective view of a portion of a hydraulic hammer having a lubrication system.

FIG. 1 illustrates a perspective view of a portion of a hydraulic hammer 10. The hydraulic hammer 10 includes a housing 12 having a first end 14 and a second end (not shown) distal to the first end 14. The first end 14 of the housing 12 is adapted to couple to a boom assembly of a machine, such as an excavator. In an example, the first end 14 of the housing may be coupled to a stick of the boom assembly using a mounting bracket, The housing 12 is used for accommodating plurality of components, such as a power cell (not shown), a piston (not shown) and bearing components (not shown) to facilitate operation of the hydraulic hammer 10. The piston is coaxially disposed within the housing 12 to reciprocate along a longitudinal axis of the housing 12. On reciprocation, the piston strikes a work tool (not shown) coupled to the second end of the housing 12 and cause the work tool to vibrate to break rocks and to penetrate through a work surface.

In an embodiment, the hydraulic hammer 10 further includes a lubrication system 18 disposed within the housing 12. More specifically, the lubrication system 18 is disposed proximal to the first end 14 of the housing 12 such that the lubricant is supplied to the plurality of components disposed downstream of the lubrication system 18. The lubrication system 18 supplies a lubricant to the plurality of components of the hydraulic hammer 10 during operation of the hydraulic hammer 10. The lubrication system 18 is in fluid communication with each of the multiple components, such as the piston and the work tool via multiple oil passages defined within housing 12. The hydraulic hammer 10 is fluidly communicated with a hydraulic system of the machine to which the hydraulic hammer 10 is attached. The hydraulic system is adapted to actuate the lubrication system 18 during operation of the hydraulic hammer 10. The constructional and operational features of the lubrication system 18 will be described in detail herein below.

Figure 2:
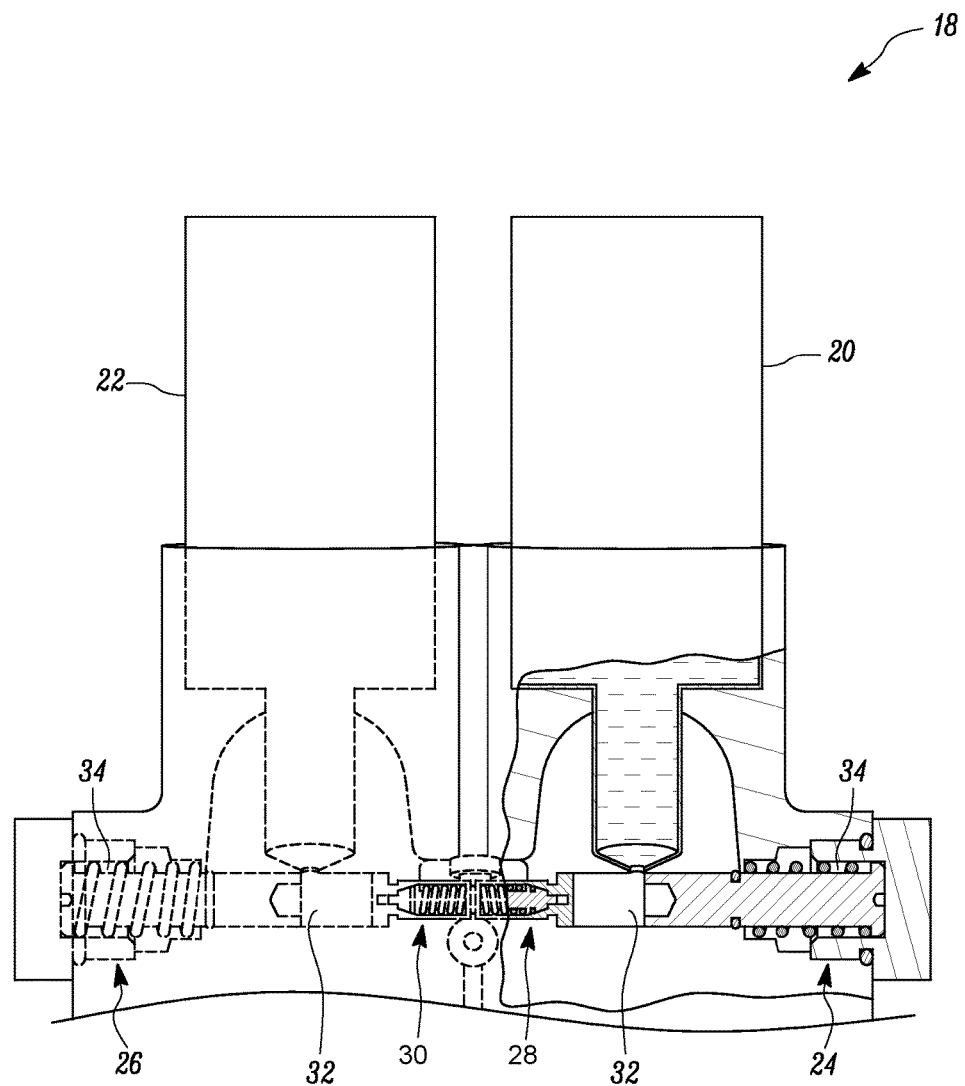
FIG. 2 is a cut sectional view of the lubrication system of FIG. 1 having a reservoir and a pump.

FIG. 2 illustrates a cut sectional view of the lubrication system 18. The lubrication system 18 includes a first reservoir 20 and a second reservoir 22 for containing lubricant, such as grease. However, it should be understood that the lubrication system 18 may include one reservoir or more than two reservoirs. In the illustrated example, each of the first reservoir 20 and the second reservoir 22 is a grease cartridge. Upon complete consumption of the grease, either the cartridge may be refilled with grease or the empty cartridge may be replaced with a new grease cartridge. The lubrication system 18 further includes a first pump 24 and a second pump 26 defined within the housing 12 of the hydraulic hammer 10. The first pump 24 is fluidly communicated with the first reservoir 20 and the second pump 26 is fluidly communicated with the second reservoir 22 to supply the lubricant from the first and second reservoirs 20, 22 to the plurality of components disposed downstream of the lubrication system 18. The lubrication system 18 further includes a first control valve 28 and a second control valve 30 fluidly communicated with the first pump 24 and the second pump 26, respectively, to allow flow of the lubricant from the first and second reservoirs 20, 22 to the plurality of components disposed downstream of the lubrication system 18. Construction and structure of the second reservoir 22, the second pump 26, and the second control valve 30 are similar to the first reservoir 20, the first pump 24, and the first control valve 28, respectively. Hence, the constructional and structural details of the first reservoir 20, the first pump 24, and the first control valve 28 are described in detail for explanation purpose of the present disclosure. The first pump 24, the first reservoir 20, and the first control valve 28 are hereinafter referred to as "the pump 24", "the reservoir 20" and "the control valve 28", respectively.

Figure 3:
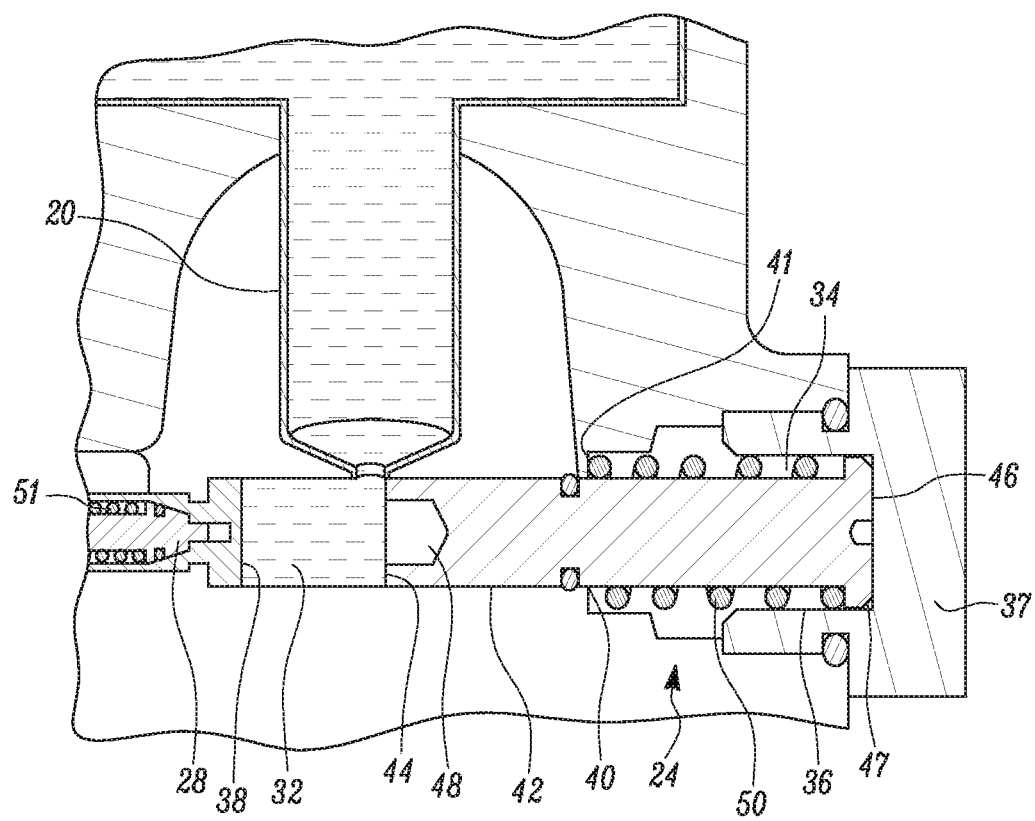
FIG. 3 is a sectional view of a portion of the lubrication system of FIG. 2. having a piston of the pump disposed at a first position.

FIG. 3 illustrates an enlarged view of a portion "A" of the lubrication system 18 of FIG. 2. Refer to FIG. 2 and FIG. 3, the pump 24 includes the housing 12 having a first chamber 32 and a second chamber 34. The first chamber 32 is defined as a lubricant passage within the housing 12 and the second chamber 34 is defined along a thickness of a wall 36 of the housing 12. More specifically, the first chamber 32 and the second chamber 34 are defined within the housing 12 coaxially. The first chamber 32 includes a first end 38 and a second end 40 distal to the first end 38. The reservoir 20 is coupled proximal to the first end 38 of the first chamber 32 to supply the lubricant to the first chamber 32. The reservoir 20 is disposed vertically and an inlet of the reservoir is fluidly communicated with the first chamber 32 such that the lubricant enters into the first chamber 32 due to gravity. The second chamber 34 is defined at the second end 40 of the first chamber 32. The second chamber 34 is defined as a hollow space within the wall 36 of the housing 12. The hollow space is further covered by a cap 37 to define the second chamber 34 coaxial to the first chamber 32. The second chamber 34 is adapted to fluidly communicate with the hydraulic system of the machine. More specifically, the second chamber 34 includes an opening (not shown) for fluidly communicating with the hydraulic system such that, during the operation of the hydraulic hammer 10, a pressurized hydraulic fluid is supplied to the second chamber 34. In an example, the hydraulic system may include a pump, which may receive a driving power from an engine of the machine to supply the pressurized hydraulic fluid to the second chamber 34 during operation of the hydraulic hammer 10. The pressure of the hydraulic fluid within the second chamber 34 may be varied based on various parameters including, but not limited to, a volume of the second chamber 34. In the illustrated example, the first chamber 32 has an inner diameter that remains constant throughout a length thereof and the second chamber 34 has an inner diameter greater than the inner diameter of the first chamber 32. Hence, one or more step portions 41 are defined at a juncture of the first chamber 32 and the second chamber 34.

Figure 4:
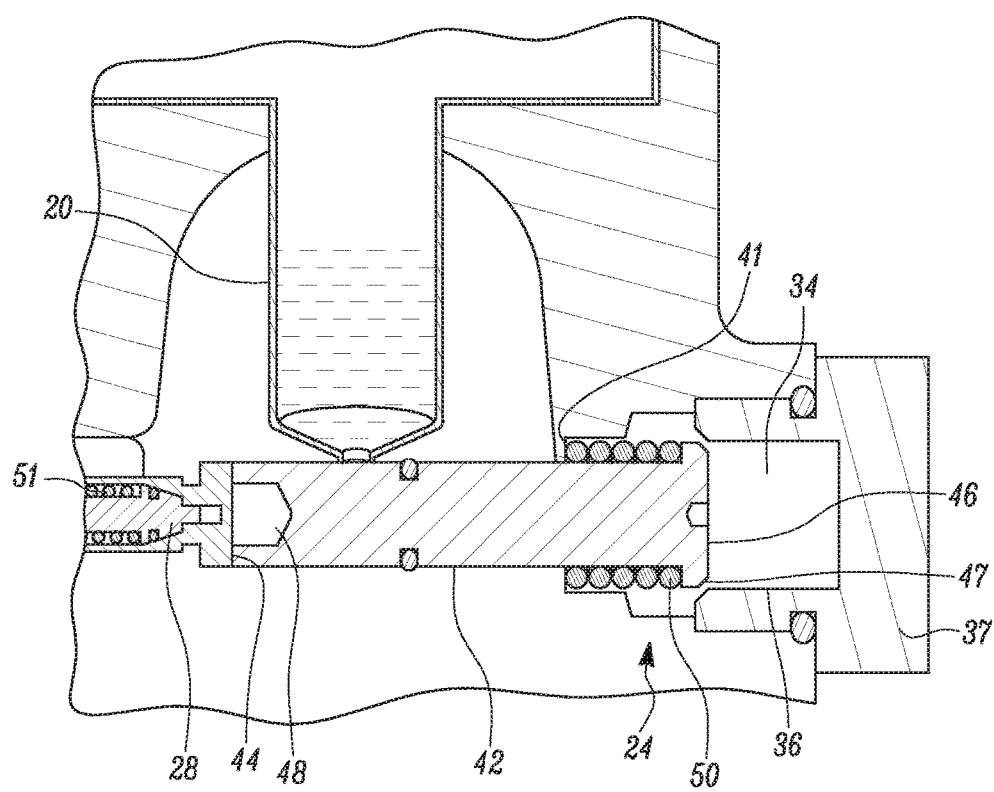
FIG. 4 is a sectional view of a portion of the lubrication system of FIG. 2 having the piston disposed at a second position.

The pump 24 further includes a piston 42 received within the first chamber 32. The piston 42 is adapted to be movable between a first position 'F1' and a second position 'F2' (as shown in FIG. 4). The piston 42 includes a first end 44 and a second end 46 opposite to the first end 44. The first end 44 of the piston 42 further includes a cavity 48 defining a volume 'V'. The second end 46 of the piston 42 faces the second chamber 34 and is disposed within the second chamber 34 against a biasing force of an elastic member 50. In the illustrated example, the elastic member 50 is a compression spring. One end of the elastic member 50 rests against the step portion 41 defined between the first chamber 32 and the second chamber 34 and another end is attached to a flange 47 provided at the second end 46 of the piston 42. As such, the piston 42 is moved from the first position 'F1' to the second position 'F2' against the biasing force of the elastic member 50. Further, movement of the piston 42 from the first position 'F1' to the second position 'F2' is controlled based on the pressure of the hydraulic fluid supplied to the second chamber 34 and the biasing force of the elastic member 50. The elastic member 50 also enables movement of the piston 42 from the second position 'F2' to the first position 'F1' when the hydraulic fluid is relieved from the pressure at which the piston 42 is moved from the first position 'F1' to the second position 'F2'. The volume 'V' of the cavity 48 is defined based on parameters including, but not limited to, the biasing force of the resilient member 51 and a volume of the first chamber 32 defined by the first end 44 of the piston 42 in the first position 'F1' of the piston 42. The cavity 48 is also designed in such way to maintain structural rigidity of the piston 42 by considering various dimensional characteristics of the piston 42 including, but not limited to, a length of the piston 42 and an outer diameter of the piston 42.

The control valve 28 of the lubrication system 18 is disposed proximal to the first end 38 of the first chamber 32. The control valve 28 is further in fluid communication with the first chamber 32. In the illustrated example, the control valve 28 is a check valve. The control valve 28 is adapted to be movable from a closed position to an open position against a biasing force of a resilient member 51 to allow flow of the lubricant to the plurality of components disposed downstream of the control valve 28. In an example, a valve opening is defined at the first end 38 of the first chamber 32 and the valve opening is normally closed by the control valve 28 in the closed position of the control valve 28. The control valve 28 is normally seated within the valve opening against the biasing force of the resilient member 51. In the illustrated example, the resilient member 51 is a compression spring. In the open position, the control valve 28 moves against the biasing force of the resilient member 51 to allow flow of the lubricant to the plurality of components disposed downstream of the control valve 28.

FIG. 4 illustrates a sectional view of a portion of the lubrication system 18 having the piston 42 disposed at the second position 'F2'. During operation of the hydraulic hammer 10 and the machine, the hydraulic fluid is supplied to the second chamber 34 at desired pressure. As a force developed within the second chamber 34 due to the desired pressure of the hydraulic fluid becomes greater than the biasing force of the elastic member 50, the piston 42 starts moving from the first position 'F1' to the second position 'F2'. During the movement of the piston 42 from the first position 'F1' to the second position 'F2', the lubricant stored in the first chamber 32 gets pressurized. As a force developed within the first chamber 32 due to the pressure of the lubricant becomes greater than the biasing force of the resilient member 51, the control valve 28 displaces from the closed position to the open position to allow the lubricant to flow towards the plurality of component of the hydraulic hammer 10. When the pressure of the hydraulic fluid is relieved within the second chamber 34, the elastic member 50 causes the piston 42 to move back to the first position 'F1'. Such continuous movement of the piston 42 between the first position 'F1' and the second position 'F2' supplies the lubricant to the components of the hydraulic hammer 10 during operation thereof. Over a period of time, the lubricant present in the reservoir may be completely consumed, which an operator may fail to notice.

Figure 5:
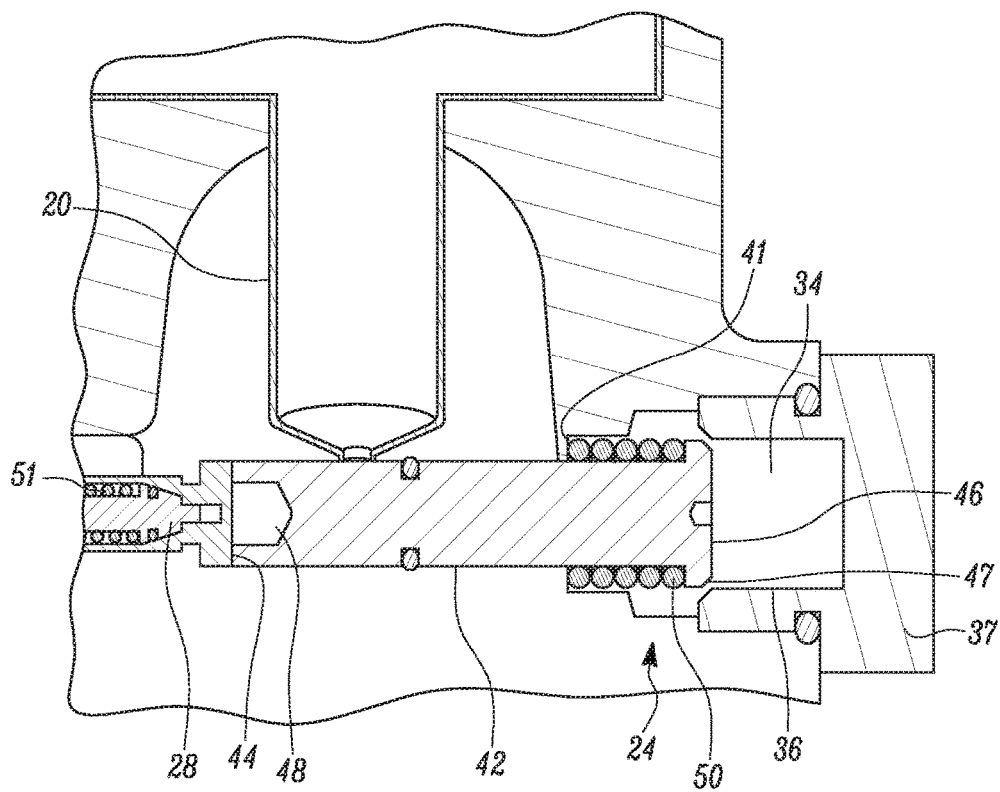
FIG. 5 is a sectional view of a portion of the lubrication system of FIG. 2 having the piston disposed at the second position, when the reservoir is empty.

FIG. 5 illustrates a sectional view of a portion of the lubrication system 18 having the piston 42 disposed at the second position 'F2', when the reservoir 20 is empty. In operation, when the second chamber 34 fails to receive the hydraulic fluid therein or a force developed within the second chamber 34 due to the pressure of the hydraulic fluid becomes less than the biasing force of the elastic member 50, the piston 42 moves to the first position 'F1'. In the first position 'F1', air present in the reservoir 22 enters into the first chamber 32 due to a vacuum created by the piston 42 within the first chamber 32.

When the piston 42 moves from the first position 'F1' to the second position 'F2', the air received within the first chamber 32 in the first position 'F1' of the piston 42 gets compressed. Further, the air contained within the volume of the first chamber 32 defined by the first end 44 of the piston 42 is compressed within the cavity 48 of the piston 42. However, a force developed within the cavity 48 of the piston 42 due to the pressure of the air is less than the biasing force of the resilient member 51. As the force caused due to the compression of the air within the cavity 48 is less than the biasing force of the resilient member 51, the control valve 28 continues to stay in the closed position. Thus, the control valve 28 prevents flow of air to downstream of the control valve 28, when the reservoir 22 becomes empty.

Various embodiments disclosed herein are to be taken in the illustrative and explanatory sense, and should in no way be construed as limiting of the present disclosure.

INDUSTRIAL APPLICABILITY

The present disclosure provides the lubrication system 18 for the hydraulic hammer 10. The second chamber 34 and the resilient member 51 aids in moving the piston 42 from the first position 'F1' to the second position 'F2'. In addition, the cavity 48 provided at the first end 44 of the piston 42 aids in retaining the control valve 52 in the closed position, and prevents transfer of air into the hydraulic hammer 10 when the reservoir is empty.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A lubrication system for a hydraulic hammer, the lubrication system comprising:
    a housing defining a first chamber and a second chamber, the first chamber extending from a first end to a second end distal to the first end;
    a reservoir containing a lubricant coupled proximal to the first end of the first chamber to supply the lubricant to the first chamber;
    a control valve disposed proximal to the first end of the first chamber and fluidly communicated with the first chamber, the control valve being moveable from a closed position to an open position against a biasing force of a resilient member to allow a flow of the lubricant to a plurality of components disposed downstream of the control valve; and
    a piston disposed within the first chamber and moveable between a first position and a second position, the second position of the piston corresponding to a peak of a compression stroke of the piston toward the first end of the first chamber, the piston including:
        a first end facing toward the control valve, the first end of the piston defining a cavity; and
        a second end opposite to the first end and facing toward the second chamber, the second chamber adapted to receive a hydraulic fluid therein to move the piston from the first position to the second position, wherein in the second position, when the lubricant is received within the first chamber in the first position of the piston, a pressure of the lubricant causes movement of the control valve from the closed position to the open position to allow flow of the lubricant to the plurality of components, and wherein in the second position, when the first chamber is filled with air in the first position of the piston, the cavity defined at the first end of the piston maintains pressure of the air less than the biasing force of the resilient member to keep the control valve in the closed position.

2. A pump for supplying a lubricant in a hydraulic hammer, the pump comprising:

a housing having a first chamber adapted to receive a lubricant therein and a second chamber adapted to receive a hydraulic fluid therein; and a piston received within the first chamber, and moveable between a first position and a second position, the second position of the piston corresponding to a peak of a compression stroke of the piston within the first chamber, the piston including:

a first end facing toward a control valve disposed adjacent to a first end of the first chamber, and including a cavity defining a volume, wherein the volume is defined based on parameters including a biasing force of a resilient member causing movement of the control valve from an open position to a closed position and a volume of the first chamber defined by the first end of the piston in the first position of the piston; and a second end opposite to the first end and facing toward the second chamber to move the piston from the first position to the second position based on a pressure of the hydraulic fluid, wherein in the second position, when the first chamber is filled with air in the first position of the piston, the cavity defined at the first end of the piston maintains pressure of the air less than the biasing force of the resilient member to keep the control valve in the closed position.

3. The lubrication system of claim 1, wherein a longitudinal centerline of the piston intersects with a surface of the first end of the piston that defines the cavity.

4. The lubrication system of claim 1, further comprising an elastic member that biases the piston toward the first position, the elastic member being configured to drive the piston from the second position to the first position.

5. The pump of claim 2, wherein a longitudinal centerline of the piston intersects with a surface of the first end of the piston that defines the cavity.

6. The pump of claim 2, further comprising an elastic member that biases the piston toward the first position, the elastic member being configured to drive the piston from the second position to the first position.

* * * * *